Sept. 22, 1953 D. G. C. LUCK ET AL 2,653,187

SYNCHRONIZING APPARATUS

Filed April 4, 1950 2 Sheets-Sheet 1

INVENTORS
DAVID G. C. LUCK
& LESLIE L. BURNS, JR.
BY
ATTORNEY

INVENTORS
DAVID G. C. LUCK
& LESLIE L. BURNS, JR.
BY [signature]
ATTORNEY

Patented Sept. 22, 1953 2,653,187

UNITED STATES PATENT OFFICE 2,653,187

SYNCHRONIZING APPARATUS

David George Croft Luck and Leslie Lewis Burns, Jr., Princeton, N. J., assignors to Radio Corporation of America, a corporation of Delaware Application April 4, 1950, Serial No. 153,882

4 Claims. (Cl. 178—69.5)

This invention relates to an apparatus for inserting a burst of control frequency into the signal train of a television transmitter.

Under some circumstances, it becomes necessary to convey synchronizing information in addition to that already transmitted in accordance with present television standards. For example, in certain color television systems it is necessary to precisely synchronize the phase of a sampling oscillator at the receiver with a sampling oscillator at the transmitter. This is necessary because the transmitted signal successively represents the intensities of the different component colors.

In accordance with previously suggested arrangements, this may be accomplished by inserting a burst of the desired frequency during the interval following the horizontal sync pulses. This is known as the back porch interval. The burst of control frequency is then selected by various means in the receiver and employed to control the phase of the sampling oscillator therein. These previous arrangements are such that the burst of control frequency also occurs during the vertical blanking period. During this period, the cathode ray beam in the kinescope of the receiver is moving back to the top of the image in preparation for the scanning of the next field.

The presence of the burst of control frequency during certain portions of the vertical blanking period may interfere with the optimum operation of some transmitters and some receivers. For example, the burst of control frequency will be superimposed on the vertical sync pulses. This has been found to introduce improper operation in the sync stretcher circuits. Such circuits are discussed in Issue No. 49 Broadcast News 1948. Such circuits are employed to insure that the sync pulses have the required amplitude. The burst may make the signal appear larger than it actually is.

As the burst of control frequency appears only after alternate equalizing pulses, the phase of the scanning of one field may be changed with respect to the other so that the interlaced lines may, in the extreme case, be superimposed on top of one another. This not only has the effect of giving erroneous information, but it also cuts the effective vertical resolution in half.

Generally, the burst of control frequency is mounted on a pedestal so that its negative peaks coincide with the black level. In previous arrangements, it has been possible to adjust the height of the pedestal in one direction only. This has been occasioned by the fact that the pedestal has been used to trigger a gate circuit to which the output of the sampling oscillator has been supplied. However, the frequency response of the transmission system as a whole may be such that the amplitude of the sampling frequency is reduced. The burst of sampling frequency would therefore appear as an A. C. variation in the top of a direct current pulse.

This undesirable effect may be avoided in accordance with another aspect of this invention by adding to the output of the gating circuit another pedestal. If the height of this latter pedestal can be adjusted to add or subtract from the original pedestal created by the gate circuit itself, the negative peaks of the control frequency may be adjusted precisely with the black level.

Therefore, in accordance with this invention, the burst of control frequency is not transmitted during certain portions of the vertical blanking interval.

An object of this invention is to provide an improved burst signal generator that prevents the burst of control frequency from interfering with the normal operation of either transmitter or receiver.

A further object of the invention is to provide improved means for adjusting the negative peaks of the burst of control frequency to the black level.

It is another object of this invention to provide means for generating a gating pulse only during certain back porch intervals.

These and other objects and advantages will become apparent from a detailed consideration of the drawing in which.

Figures 1, 1A, 1B, 1C, 2:
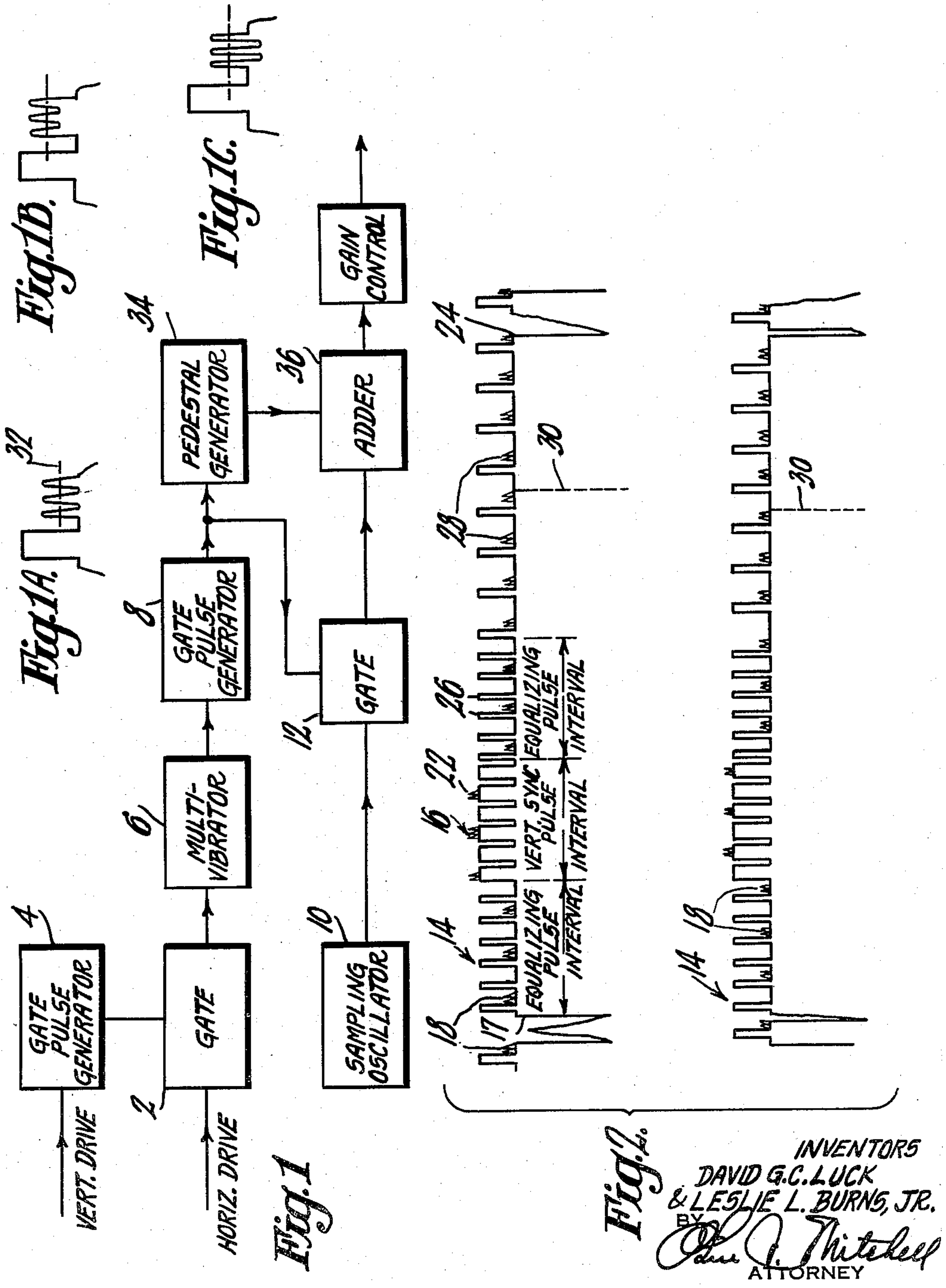
Figure 1 is a block diagram of both aspects of the invention discussed above.
Figure 2 illustrates the standardized television synchronizing wave forms now in use.

In Figure 1 pulses of line frequency are supplied to a gating device 2. Pulses of field frequency are supplied so as to initiate the operation of a gate pulse generator 4. These gating pulses produced by generator 4 are applied so as to render the gating device 2 incapable of passing certain pulses of line frequency. The particular pulses of field and line frequency that are selected depend upon circumstances and will be discussed more in detail hereinafter.

The pulses of line frequency that are passed by the gating device 2 are employed to trigger another gating pulse generator. This may assume any number of forms but, in the particular example, it is comprised of multivibrators 6 and 8 operating in cascade. The multivibrator 6 may be triggered by either the leading or trailing edges of the line frequency. In this way, the gating pulse supplied by the multivibrator 8 may be started at any desired interval after a pulse of line frequency. Of course, these gating pulses are not generated for given portions of the field frequency pulses.

The gating pulses thus developed can be used to provide bursts of the sampling frequency to the output circuits in the following manner.

The control frequencies to be superimposed during the back porch are derived from a sampling oscillator 10, the output of which is applied to a second gating circuit 12. The gating circuit 12 can be comprised of any means necessary to provide a voltage wave containing the sampling frequency. Its ability to provide such a wave is interrupted by the gating pulse from the multivibrator 8.

This gating circuit is operated by the gating pulses derived from the multivibrator 8.

Reference is now made to Figure 2 for a brief description of the factors involved in the selection of the various pulses of line and field frequency used in the apparatus of Figure 1.

Whether the horizontal drive or complete sync pulses are applied to the gating circuit 2 is a matter of convenience.

However, the source of the field frequency pulses applied to the gate pulse generator 4 must be carefully considered. Reference is therefore made to Figure 2 which illustrates the standardized television synchronizing wave form. The upper wave form illustrates the relationship between the various synchronizing pulses from the first field. The lower wave form illustrates these synchronizing pulses on a succeeding or interlaced field. The six pulses 14 are known as equalizing pulses and they occur at double the line frequency. The following six broad pulses, generally indicated by the numeral 16, are the vertical sync pulses. These pulses control the phase of the field scanning operation.

In most receivers the phase of the starting point of the first of these pulses is determined by the charge on a condenser. The charge on this condenser is primarily affected by the energy appearing above the black level 15 during the interval occupied by equalizing pulses 14. Now, if a burst of control frequency is superimposed on the black level following each horizontal sync pulse, they will occur as indicated by the wave forms 18. In the lower wave form, the wave forms 18 occur between the last equalizing pulse and the first of the vertical sync pulses 16. In the upper wave form there is one equalizing pulse 14 between the last burst and the beginning of the first of the vertical sync pulses 16. There is then a possibility that the charge on the condenser can be sufficiently altered by the position of this burst so as to effectively change the phase of the field scanning interval initiated by the vertical sync pulses 16. As the phase is changed, the interlaced pattern is gradually lost until in the extreme, a change of 180 degrees would cause the interlaced field to land on top of the first field. This would not make a confusing image, but would lower the vertical resolution by a factor of one-half.

Under these conditions, it is desirable to apply a field frequency pulse to the gate pulse generator 4 that will cause the latter to blank out the gate 2 just before the equalizing pulses 14 begin. The leading edge of the vertical blanking pulse is suitable for this purpose, as it occurs just before the equalizing pulses 14, at a point 17.

In the transmitter equipment wherein a burst of control frequency follows each and every horizontal drive pulse, these bursts will appear superimposed on top of the vertical sync pulses 16, as indicated by the wave forms 22. In some transmitters presence of these pulses can upset the amplification characteristics. When the pulses 22 appear the sync pulse stretcher circuits, for example, may reduce the amplification as the pulses above the black level appear too large. Unless the sync pulse stretcher circuits can recover with sufficient speed, the first portion of the picture may be affected.

These difficulties can be avoided if the field frequency pulses that are applied to block the gate 2 last throughout the vertical sync pulses 16. The vertical driving pulses generally used to drive the vertical deflection of the pick up cameras at the transmitter may be employed to trigger the gate generator 4.

The next matter of importance is the duration of the gating pulses that are applied to the gate 2 by the gate pulse generator 4. Assume that the leading edge of the gating pulses effectively coincides with the leading edge of the field frequency pulses applied to the gate pulse generator 4. The length of the duration of a gate pulse can be adjusted at will. If vertical blanking pulses are employed or any other pulse commencing at point 17 just before the equalizing pulses 14, it is preferable that the gate pulse provided by the generator 4 last until the end of the vertical sync pulses 16. In some cases, it may be desirable to continue the gating pulse until the second set of equalizing pulses 26 have passed by.

It might at first appear that the vertical blanking pulse itself could be applied to the gate 2. However, this would not permit the bursts of control frequency 28 to be applied for a sufficient time to bring a sampling oscillator at the receiver into exact phase synchronism prior to beginning picture transmission for the next field. Therefore, the preferable location of the trailing edge of the gate pulse applied to the gating device 2 would seem to be at the latest point several lines before the end of vertical blanking such as indicated by the dotted line 30. This is so whether the beginning of the gating pulse occurs just before the equalizing pulses 14 or just before the vertical sync pulses 16.

We turn again to Figure 1 for an illustration of another aspect of this invention. As is well known to those skilled in the art, the height of the pulse supplied by the multivibrator 8 of Figure 1 to the gate 12 can be adjusted. This pulse, however, is employed to trigger the gate 12 into conduction so that it can pass a burst of control frequency from the sampling oscillator 10. It is therefore desirable that the pulse be of sufficient amplitude to cause the gate 12 to operate on a portion of its characteristics having reasonably high gain and good linearity. Under most conditions, the height of this pulse may be chosen so that the burst of control frequency has its negative peaks coinciding with the black level, as shown in Figure 1A. The height of the pedestal employed in this case is indicated by the dotted line 32 which is the A. C. axis of the burst of control frequency.

If, however, the transmission system should de-emphasize the control frequency, the transmitted wave would appear as shown in Figure 1B. The pedestal height is the same, but the amplitude of the control frequency wave is reduced. It might at first be thought that this effect could be overcome by lowering the amplitude of the pulse provided to the gate 12. However, as stated above, this would cause the gate 12 to operate on a lower gain or a non-linear portion of its characteristic.

If, on the other hand, the transmission system accentuates the control frequency, a condition such as that illustrated by Figure 1C exists. The control frequency now has an amplitude such that it extends down below the black level. This can cause traces to appear on the kinescope at the receiver when the beam is supposed to be blanked out on its way back to start another horizontal sweep. It will be noted that the height of the pedestal is still the same as before. It might be thought that the height of the pedestal could be increased so as to place the negative peaks of the control frequency at the black region. This, however, might cause the gate 12 to operate at a point approaching plate saturation. Here again, low gain and non-linearity may result.

These difficulties are all overcome by applying the output of the multivibrator 8 to a pedestal generator 34 and applying its output to an adder 36. The output of the gate 12 is also supplied to the adder 36. By adjusting the height of the pedestal supplied by the pedestal generator 34, the level of the burst of control frequency can be adjusted to any desirable position without affecting the operation of the gate circuit 12.

Figure 3:
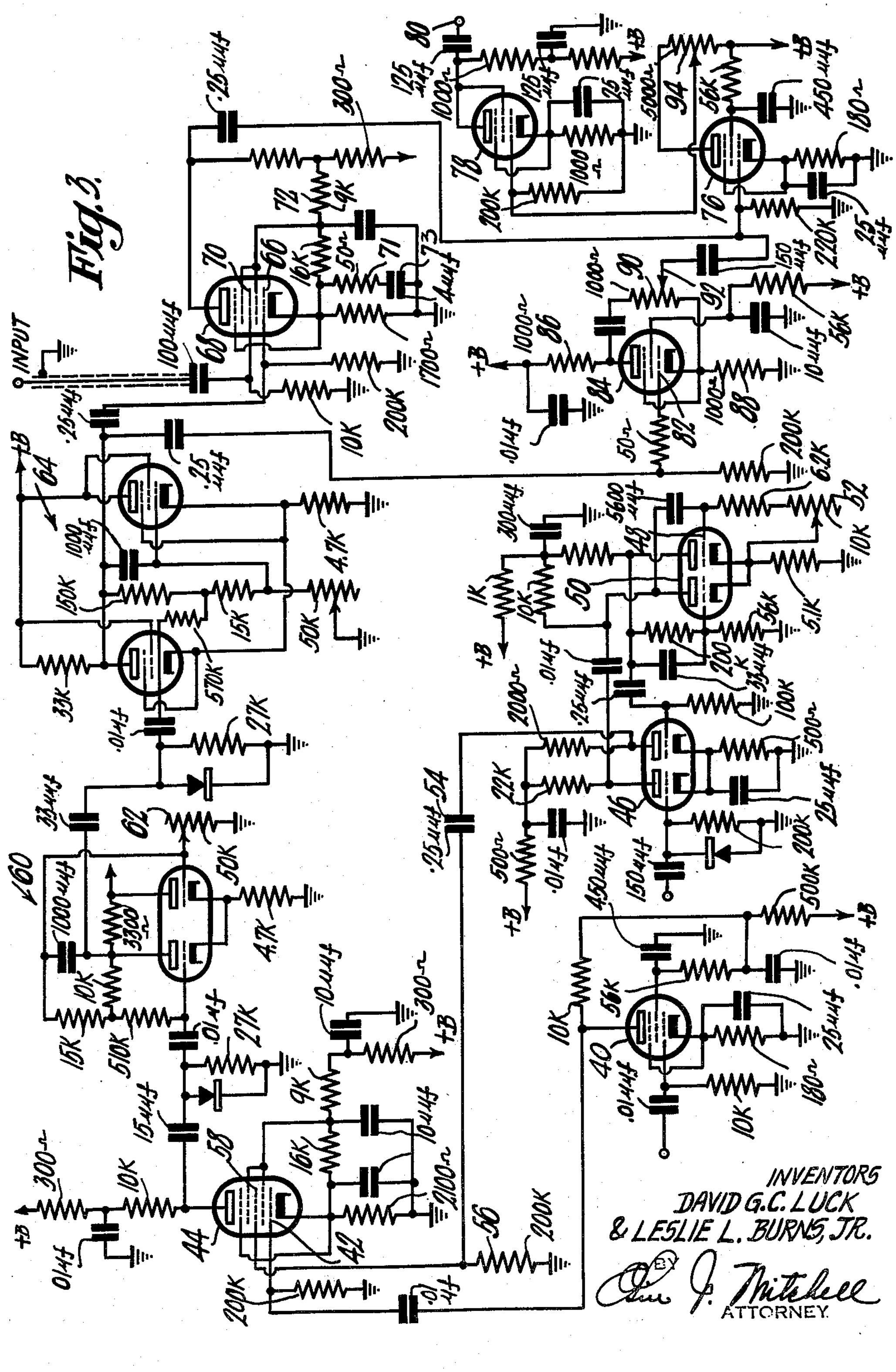
Figure 3 illustrates in schematic form a particular embodiment of both aspects of this invention.

Figure 3 illustrates in schematic form details of a circuit which has proven effective in carrying out both aspects of this invention. The invention is not limited by the values of the circuit parameters or by the tube type. Whereas the block diagram of Figure 1 is considered sufficient to teach the invention to those skilled in the art, it is felt that the following discussion may be helpful to a more detailed understanding of the factors involved. In this particular arrangement the line frequency pulses are negative horizontal drive pulses and the field frequency pulses are positive vertical drive pulses, both normally available as outputs from the studio sync generator. After the negative horizontal drive pulses have been amplified in the amplifier 40, they are applied to the grid 42 of the gating tube 44. The positive vertical drive pulses are amplified in the left half of a tube 46. The negative output of this tube is applied to the grid 48 of a multivibrator generally indicated by the numeral 50. The details of operation of the multivibrator need not be explained, as it is a type well known to those skilled in the art. A positive gating pulse is supplied by the multivibrator 50 in response to the triggering of the leading edge of the vertical drive input. This positive pulse is amplified in the right hand half of the amplifier 46. The duration of this positive pulse may be suitably adjusted by varying the rheostat 52 in the multivibrator circuit. The right hand half of the amplifier 46 therefore supplies a negative pulse that starts at the beginning of the vertical drive pulses and ends at a time determined by the setting of the potentiometer 52.

This negative pulse is applied via a condenser 54 and a resistor 56 to a grid 58 of the gating tube 44. The amplitude of this pulse is sufficiently large to cut off the gating tube 44 in the presence of the positive horizontal drive pulses coming from the amplifier 40. In the particular arrangement the gate 44 is cut off at the beginning of the equalizing pulses 14 of Figure 2. It is turned on again at a point determined by the setting of the potentiometer 52 in the multivibrator 50.

When the horizontal drive pulses are permitted to pass through the gate 44, they initiate a delay multivibrator 60, the details of which are familiar to those skilled in the art. The pulse provided by the multivibrator 60 is delayed by an amount determined by the setting of the potentiometer 62. This delayed pulse initiates the operation of a gate pulse generator generally indicated by the numeral 64. The amount of time between the beginning of the horizontal sync pulse and the beginning of the burst is thus determined by the potentiometer 62.

The output of the gate pulse generator 64 is applied positively to a grid 66 of another gating device generally indicated by the numeral 68. The control frequency, in this case 3.58 mc., is applied to a grid 70 of the gating device 68. The tube 68 is normally cut off by the positive potential in the cathode that is derived from the bleeder generally indicated by the numeral 72. In this way, bursts of the 3.58 mc. control frequency are supplied via an adding amplifier 76 and an amplifier 78 to an output terminal 80.

In order to eliminate the overshoots that occur as a result of the square pulses applied to the grid 66, a resistor 71 and a condenser 73 are connected in parallel with the cathode resistor as shown. In accordance with a second aspect of this invention, the gating pulses are also supplied to the grid 82 of the pedestal generator 84. The output of this generator is divided between the plate load resistor 86 and the cathode resistor 88. The difference in potential appearing at the plate and cathode of the pedestal generator appears across a potentiometer 90. Therefore, by varying a movable arm 92 of the potentiometer 90, positive or negative pulses of different amplitudes may be selected from the output of the pedestal generator 84. These are also coupled to the amplifier 76. In this way, the A. C. axis of the burst of the 3.58 mc. energy can be adjusted to any desired position without affecting the operation of the gating device 68. The amplitude of the burst itself can also be adjusted by the potentiometer 94 in the plate circuit of the amplifier 76. The arrangement just described is extremely flexible in that the burst of control frequency can be freely positioned in amplitude and time. It is to be understood that the burst of control frequency appearing at the output terminal 80 is to be combined with the normal signal train so as to produce a composite waveform such as shown in Figure 2. Because the methods of operation of achieving this combination are not a part of the invention, it is unnecessary to discuss them here.

Having described my invention, what is claimed is:

1. An apparatus for generating a burst of sampling frequency during the back porch interval of a television signal comprising in combination a source of pulses occurring at line frequency, a gate pulse generator that is triggered by said pulses, a gate to which said pulses are applied, an oscillator of sampling frequency, connections for applying the output of said oscillator to said gate, means for generating pulses of a desired magnitude during the pulses provided by said gate pulse generator in response to said gating pulses, and means for combining the output of said gate and said latter means.

2. Apparatus for deriving a burst of control frequency to be inserted in a television signal comprising in combination a source of vertical drive pulses occurring at field repetition rate, a source of horizontal drive pulses occurring at line repetition rate, a sampling oscillator, a first gating device through which said horizontal drive pulses are passed, a pulse generator for deriving pulses of a predetermined duration in response to said vertical drive pulses, connections for applying said pulses of predetermined duration to said gating device so as to prevent the latter from passing the horizontal drive pulses, a second gating device, the output of said sampling oscillator being applied to said second gating device, and means for rendering said second gating device operable to pass said sampling frequency for predetermined intervals in response to the horizontal drive pulses passed by said first gating device.

3. A burst generator comprising in combination a source of pulses of line frequency, a source of pulses of field frequency, a sampling oscillator, a gating circuit to which the output of said oscillator is applied, means for rendering said gating circuit capable of passing the output of said oscillator during a predetermined interval following at least some of the line frequency pulses, and means responsive to said field frequency pulses for rendering said gate circuit incapable of passing said output of said oscillator during other of said predetermined intervals following the beginning of said field frequency pulse.

4. An apparatus for producing a gating pulse during predetermined back porch intervals of a television signal comprising in combination a source of pulses of line frequency, a source of pulses of field frequency, a gate pulse generator, a gating circuit connected between said source of line frequency pulses and said generator, said gating circuit being normally adapted to pass the line frequency pulses applied to it and means for rendering said gate incapable of passing the line frequency pulses applied to it in response to said field frequency pulses.

DAVID GEORGE CROFT LUCK.
LESLIE LEWIS BURNS, Jr.

References Cited in the file of this patent

UNITED STATES PATENTS

| Number | Name | Date |
|---|---|---|
| 2,141,343 | Campbell | Dec. 27, 1938 |
| 2,230,284 | Cawein | Feb. 4, 1941 |
| 2,319,789 | Chambers | May 25, 1943 |
| 2,378,746 | Beers | June 19, 1945 |
| 2,546,972 | Chatterjea | Apr. 3, 1951 |
| 2,570,775 | De Baun | Oct. 9, 1951 |